UNITED STATES PATENT OFFICE.

MILTON F. BEECHER, OF WORCESTER, MASSACHUSETTS, ASSIGNOR TO NORTON COMPANY, OF WORCESTER, MASSACHUSETTS, A CORPORATION OF MASSACHUSETTS.

TRANSLUCID ANTISLIPPING TILE.

1,374,136.　　　　　Specification of Letters Patent.　　Patented Apr. 5, 1921.

No Drawing.　　　Application filed August 3, 1918. Serial No. 248,223.

*To all whom it may concern:*

Be it known that I, MILTON F. BEECHER, a citizen of the United States of America, residing at Worcester, in the county of Worcester and State of Massachusetts, have invented certain new and useful Improvements in Translucid Antislipping Tiles, of which the following is a full, clear, and exact specification.

My invention relates to safety treads and more particularly to translucid tiles, having hard, wear-resisting, anti-slipping granular material incorporated therein and designed especially for illuminating vault covers and generally for preventing slipping of pedestrians on any tread surface.

In the larger cities it is customary for business houses to have rooms or passages projecting from the buildings beneath the sidewalk or pavement, and to provide tread surfaces for the sidewalk which permit the passage of light therethrough. The construction ordinarily involved is that of a metal framework carrying glass bodies fixed therein, but it is found that these glass bodies and their supporting frames are very slippery and frequently cause accidents to pedestrians.

Numerous attempts have been made to provide non-slip vault covers or illuminating tread surfaces by making the frame supporting the glass tiles of a material intended to prevent slipping thereon. The frame constructions heretofore provided have proven inefficient, mainly because they soon become slippery after a short period of wear. The glasses have ordinarily been left with all their slippery features intact, although it has been proposed to provide grooves in the surface of a glass plate and fill them with cement, vitreous material or metal to prevent slipping. This latter scheme is obviously impracticable since the cement, etc., is not intimately bound to the glass and may easily be dislodged from the grooves by the shocks of pedestrian wear, and such materials in themselves have no large wearing and anti-slipping qualities and are entirely unserviceable for such purposes. Hence these proposed schemes have never been put to extended practical use and pedestrians still try to avoid walking over glass vault lights.

It has also been proposed to make safety stair and platform treads of vitrified ceramic material having anti-slipping granules incorporated therein. The process of ceramic manufacture involves the elaborate operations of mixing the various ingredients together with water to the right degree of plasticity, shaping the product as desired and then burning the body in a kiln at a high temperature for a long period of time and subsequently allowing it to cool for a similarly long time. This process is obviously slow, tedious and expensive and requires considerable skilled labor, especially in the firing or burning of the material. Safety tiles are becoming of increasing importance for use not only as vault lights but also in public thoroughfares, station platforms, stair-treads and other localities where there is danger of a pedestrian slipping on the tread surface and falling or becoming injured thereby. These blocks must be made, therefore, in large quantities, and in order that they may be utilized freely the process of manufacture should be cheapened as much as possible and it should be feasible to produce the tile rapidly and with the minimum amount of skilled labor involved. It has furthermore been found that the ceramic tiles do not possess a compact, dense structure but ordinarily have large pores and so are pervious to water. Hence moisture is absorbed by any tiles which are exposed to climatic and other like conditions and they become unsanitary and are difficult to clean.

It is accordingly an object of my invention to provide a translucid body having anti-slipping granular material incorporated therein, which may be utilized to conduct light and yet serve as a flooring or tread surface and more particularly as a vault light glass for sidewalks.

A further object of my invention is to provide a safety tread tile of a compact, dense structure which is impervious to moisture and may be kept sanitary and clean, which is highly resistant to footwear and which possesses large anti-slipping qualities and is of general utility for walk surfaces.

A still further object is to utilize the simple processes of glass manufacture and thereby to provide a safety tread or anti-slipping tile body which may be cheaply, easily and quickly manufactured, which may be cast or molded to any desired shape and does not require prolonged heat treatment thereafter but may be made by the simple process of fusing certain materials together, incorporating therewith hard, wear-resisting, anti-slipping granules and thereafter shaping the tile body as desired from the fused material.

With these and other objects in view, as will be apparent from the following disclosure, my invention resides in the combination of ingredients and the composition of a tile body as set forth in the specification and covered by the claims appended hereto.

I have found that translucid or light-conducting bodies for use in sidewalk vault lights and other lighting surfaces adapted to be exposed to considerable pedestrian foot-wear may be suitably made by incorporating a hard, wear-resisting, anti-slipping, granular material in a fused glassy silicate body in intimate relation with the constituents of the glass. For the anti-slipping material I preferably utilize a granular substance which has a hardness of nine or more on Moh's scale and which has high frictional or abrading qualities as well as great durability and wear-resisting characteristics. I find that silicon carbid and crystalline alumina are best adapted for this purpose and I preferably use the latter. The crystalline alumina may be either the natural emery or corundum or an artificial product comprising the chemical aluminum oxid combined with more or less of various impurities. The artificial alumina may be made, for example, by fusing bauxite in an electric furnace. The resulting product contains a large percentage of crystalline alumina intermingled with various impurities such as silica, titania, iron oxid, etc.

The quantity and nature of the hard, wear-resisting, non-slip material may obviously be varied, depending upon the characteristics needed for any particular locality. For some uses I prefer to employ a large proportion of the anti-slipping material with the glass, but for ordinary purposes it is sufficient that the granules be from fifteen to forty per cent. of the total mass. The size of the granules depends upon the permitted amount of abrasive action upon foot-gear, but I find that a grain passing through a 36-mesh sieve will prevent slipping and yet not cause material wear on the shoe leather. Furthermore, these granules may be located only in the top layer or surface of the block or that portion which is adapted to be exposed to the foot-wear.

In order that my invention may be more readily understood, a specific example of one composition and process of manufacture will be given. However, it is obvious that various glass making materials may be utilized and that the composition of the tile and the steps of manufacture may be varied at will by a skilled glass manufacturer within the scope of his knowledge of glass-making and the claims covering my invention. A satisfactory tile may be made of a soda-lime-magnesia glass of the following proportions:

Magnesia (MgO) -- 6.4 parts by weight.
Whiting (CaCO$_3$) -- 16.0 " " "
Soda ash (Na$_2$CO$_3$) -- 72.1 " " "
Glass sand (SiO$_2$) -- 186.0 " " "
Crystalline alumina (Al$_2$O$_3$) -- 45.0 " " "

The process of manufacture may involve well known steps in the glass-making and working industry. For example, I may mix the glass ingredients together and introduce them into a suitable glass furnace in small batches until the desired quantity has been fused. The temperature of the reaction is so regulated that the silica may be able to unite with the calcium, magnesium and sodium and form a glass which is probably a compound silicate of these metals. During this reaction there is considerable frothing, due to the evolution of carbon dioxid as bubbles, and various means or methods should be adopted to eliminate the residual bubbles in the glass, as for example by super-heating the mass after the materials have been fused and allowing the bubbles to work off gradually. Foreign bodies or other impurities present on the surface of the mass may be removed by skimming.

Since there is a tendency for the fused silicates to unite with alumina, I prefer to incorporate the crystalline alumina granules, if such are used, with the mass after the fusion and formation of the glass and preferably just before casting or molding the tiles. The viscosity of the melt is raised considerably by the addition of alumina, hence it may be advisable to maintain the high heat of fusion and not permit the material to cool to any large extent before molding, as is customary in the plate glass industry. This feature, however, depends upon the accompanying conditions of manufacture. The granular material may be mixed with the glass by a poling operation or any other suitable method, and while it is in suspension or uniformly distributed throughout the glass the mixture is poured into the molds and shaped as desired. The tiles are preferably shaped by being forced into contact with the mold by means of plungers worked by air or steam pressure.

If the granular material is to be incorporated only in the surface of the block it may be sprinkled on the surface of the fused glass in the mold and forced into the mass by pressure. This may also be accomplished by making two glass batches, one containing the granules and the other not, and forming two layers thereof in the mold. If desired, glass previously cast may be melted to sufficient plasticity to allow the incorporation therewith of the anti-slipping material. Various other methods readily suggest themselves to one skilled in this art and may obviously be utilized in the practice of my invention.

In this way I may form a translucid tile or body adapted to be used where excessive foot-wear occurs, and which will prevent slipping thereon. If the translucid properties of the tile are not desired they may be modified, disguised or removed, as by making the glass colored, frosted or opaque or to present any desired surface or optical properties. The tile may be shaped as desired but I prefer to use rectangular geometrical patterns in a floor and so make the tile as parallelepipedons. The anti-slipping glass body may be formed in irregular shapes for use as terrazzo chips in a setting plastic flooring or otherwise suitably shaped, the particular form of the tile not constituting a feature of my present invention.

Having thus described my invention, what I claim as new and desire to secure by Letters Patent is:

1. A safety tread comprising a translucid body containing hard, wear-resisting, anti-slipping, granular material intimately incorporated in the body by fusion.

2. A safety tread comprising a non-argillaceous glass body containing hard, wear-resisting, anti-slipping, granular material incorporated in its upper surface layer by fusion of the glass for exposure to pedestrian foot-wear.

3. A safety tread tile comprising a translucid body having granular material incorporated in that portion adapted to receive foot-wear, said material having a hardness of nine or more and large anti-slipping characteristics.

4. A safety tread tile comprising a dense, non-absorbent, glass-fused silicate intimately associated with hard, wear-resisting, anti-slipping granules.

5. A safety tread tile comprising a dense, non-porous glassy silicate body having a crystalline alumina material incorporated therein.

6. An anti-slipping tile comprising a body of glass having intimately incorporated therein a quantity of crystalline alumina granules.

7. A safety tread tile comprising a body of non-argillaceous glass having intimately distributed throughout its volume a quantity of granules which have a hardness of nine or more and are adapted to be exposed on the surface of the tile, as the latter wears away, and prevent a pedestrian slipping thereon.

8. A safety tread comprising a dense, non-porous and translucent glass body, the surface portion of which has at least 15% by weight of hard, wear-resisting, anti-slipping granules fused therein.

9. A safety tread comprising a dense, non-absorbent, glass body containing from 15% to 40% by weight of crystalline material of a hardness of 9 or more intimately incorporated therein.

10. A safety tread comprising a dense, non-absorbent, glass body containing from 15% to 40% by weight of crystalline alumina incorporated therein by fusion of the glass.

Signed at Worcester, Massachusetts, this first day of August, 1918.

MILTON F. BEECHER.